United States Patent [19]
Morton

[11] Patent Number: 5,866,039
[45] Date of Patent: Feb. 2, 1999

[54] LUMINESCENT DEVICE FOR DISPLAYS AND LIGHTING

[75] Inventor: David C. Morton, Eatontown, N.J.

[73] Assignee: The United States of America as represented by the Secretary of the Army, Washington, D.C.

[21] Appl. No.: 372,530

[22] Filed: Jan. 13, 1995

[51] Int. Cl.$^6$ .................................................. C09K 11/08
[52] U.S. Cl. ..................................... 252/301.4 R; 501/12
[58] Field of Search .................... 252/301.4 R, 301.6 S, 252/301.6 R, 301.16; 501/12, 32, 154, 96, 97, 134, 137

[56] References Cited

U.S. PATENT DOCUMENTS

| | | | |
|---|---|---|---|
| 2,965,784 | 12/1960 | Hoffman | 252/301.6 S |
| 3,040,202 | 6/1962 | Lehmann | 252/301.6 S |
| 5,308,804 | 5/1994 | Lee | 252/301.6 F |
| 5,313,485 | 5/1994 | Hamil et al. | 372/69 |

FOREIGN PATENT DOCUMENTS

| | | |
|---|---|---|
| 5-121169 | 5/1993 | Japan . |

OTHER PUBLICATIONS

Budd, K.D., et al "Optical Properties and Densification of Sol–Gel Derived PbTiO3 Layers", SPIE vol. 1328 Sol–Gel Optics 1990. No Month.

Chen, J., et al "Rapid Thermal Annealing of Sol–Gel Derived Lead Zirconate Titanate Thin Films", J. Appl. Phys. 71(9) May 1992.

Nosaka et al, "Sol–Gel Processing for BaTiO3 and Application to an A.C. Powder Electroluminescence Device", J. Mat'l. Sci. Lett., 10(7), pp. 406–407, 1990 no month.

*Primary Examiner*—Melissa Bonner
*Attorney, Agent, or Firm*—Michael Zelenka

[57] ABSTRACT

A luminescent composition which is a uniform admixture of a least one phosphor having a particle size of about ten micrometers or less and at least one sol gel compound in an amount sufficient to substantially encapsulate the phosphor. Luminous devices are formed by disposing this composition on a substantially transparent substrate. The use of particulate phosphors in an encapsulating medium protects the phosphor and provides dielectric strength or conduction as required. Improved luminous devices for displays and lighting are provided such as those finding use as flat panel displays and for backlights for liquid crystal flat panel displays.

4 Claims, 6 Drawing Sheets

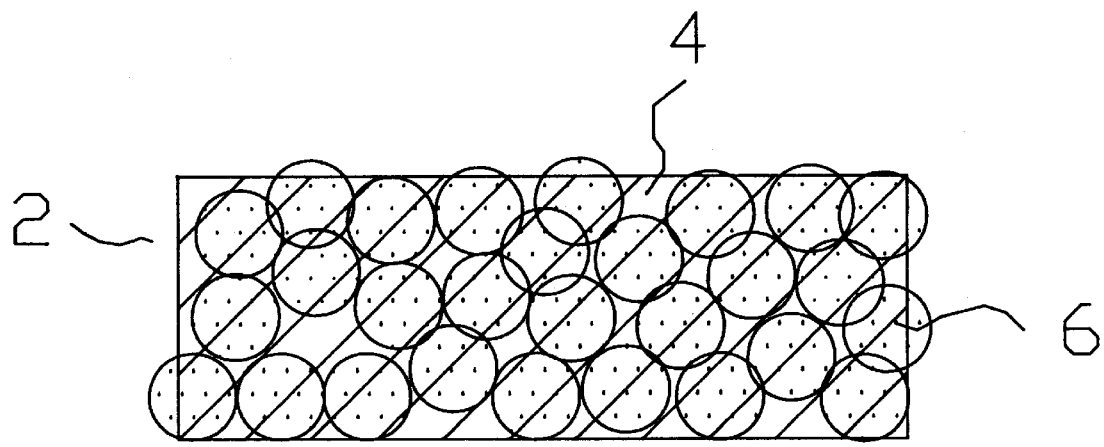
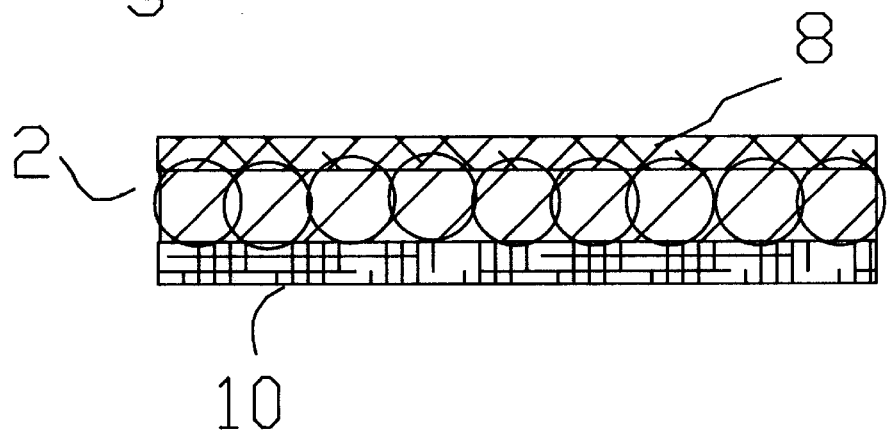

LUMINESCENT DEVICE FOR DISPLAYS AND LIGHTING

GOVERNMENT INTEREST

The invention described herein may be manufactured, used, and licensed by or for the Government of the United States of America without the payment to me of any royalty thereon.

BACKGROUND OF THE INVENTION

1. Field of the Invention

This invention relates to luminescent devices suitable for use in displays and lighting. Such find use as flat panel displays, lighting and backlights for liquid crystal flat panel displays. The flat panel display technology of this invention is useful for EL, plasma, LCD and FED displays.

2. Description of the Prior Art

In the production of electroluminescent displays, such as AC thin film electroluminescent displays, phosphors are currently applied by chemical vapor deposition, e-beam, evaporation, or sputtering techniques which results in films which are, at best, polycrystalline. In electroluminescent devices, particulate phosphors or single crystal phosphors are desirable due to the low number of defects occurring during manufacture and due to the fact that they can fully compensate for dopants. In a conventional device the phosphor is sandwiched between two thin film dielectrics which are deposited in a similar manner. A voltage is applied and the voltage is divided between the dielectrics and the phosphor. When sufficient voltage is applied electrons move in the phosphor and excite the dopant, thus giving off light. The amount of voltage on the phosphor determines how much light is obtained. The higher the dielectric constant, the more voltage which can be applied to the phosphor. Since sol gels have very high dielectric constants, by forming electoluminescent devices according to this invention, one can operate at lower voltages or use thicker layers. For particulate phosphors, which generally have a larger size than the thickness of the standard phosphor layer, similar operating voltages would be expected. This would mean brighter, more efficient displays with a much wider choice of materials for color. The use of the liquid sol gel techniques for this invention means that the cost of the devices would decrease significantly since devices could be made without the use of large expensive vapor deposition equipment. AC devices, which are currently manufactured by the aforementioned chemical vapor deposition, e-beam, evaporation, or sputtering techniques, have high luminescence and good lifetime. Thick film DC devices have low luminescence with poor aging characteristics, however, in operation the thick film devices have DC conduction through the device and the AC devices do not.

This invention allows the use of particulate phosphors in an encapsulating medium which can protect the phosphor and provide dielectric strength or conduction as required. It allows the coating of large substrates with uniform phosphor coatings by spraying, spinning or silkscreening which are standard processes for other uses. This means that patterning can also be accomplished using standard photolithographic techniques. For color displays this patterning would reduce costs by removing the process steps required to pattern the phosphor by etching. Using particulate phosphors means a larger number of phosphors is available for color EL displays since using particulate phosphors eliminates the thin film deposition step. High quality electroluminescent devices can be made for the cost of the thick film devices which are currently used for low level lighting and LCD backlights. A patterned EL or fluorescent backlight device would be used to improve the efficiency of liquid crystal displays by removing the need for color filters. This invention is also applicable for the production of plasma devices. For plasma devices there is a great advantage in the processing and reliability of the device. It is known to use particulate phosphors in plasma devices. The invention improves on these by providing a sol gel dielectric to protect the phosphors from the plasma in the device and by removing some of the contaminants used in the prior art deposition process of the phosphors. It also seals the phosphor so it cannot contaminate the vacuum or the electrodes. In an alternate embodiment, a dielectric can also be used to cover one of the electrodes. The invention is also useful for producing fluorescent lights and backlights. For plasma displays and fluorescent backlights the encapsulation composition gives improved life by protecting the phosphor from the plasma. It will also seal the phosphor thus preventing contamination of the vacuum and the electrodes. The invention also finds use in electron beam excitation applications. In cathode ray excitation applications, advantages include sealing the phosphor from the vacuum and ease of patterning high resolutions. These advantages are most useful for the field emitter displays with a small volume vacuum envelope and with a very small gap between the emitter and the screen with the luminescent display. In this application a somewhat conducting sol gel film is required so that the electrons may leak off the device. The encapsulation of the phosphor means that phosphors which normally would contaminate the emitters can now be used.

SUMMARY OF THE INVENTION

The invention provides a luminescent composition comprising a substantially uniform admixture of a least one phosphor having a particle size of about ten micrometers or less and in an amount sufficient to cause the luminescent composition to generate light substantially uniformly upon application of a phosphor excitation means, and at least one sol gel compound in an amount sufficient to substantially encapsulate the phosphor. Hereinafter, the term sol gel compound or sol gel material shall mean a compound or material made by a sol gel process.

The invention also provides a luminescent device comprising a substantially transparent substrate and the substantially uniform luminous composition layer on the substrate.

BRIEF DESCRIPTION OF THE DRAWINGS

These and other objects, features, and details of the invention will become apparent in light of the ensuing detailed disclosure, and particularly in light of the drawings wherein:

FIG. 7 shows phosphor particles having a very high packing density.

FIG. 8 shows a luminescent device wherein the sol gel dielectric has a high packing density and top and bottom layers provide additional encapsulation.

DETAILED DESCRIPTION OF THE PREFERRED EMBODIMENT

Figure 1:
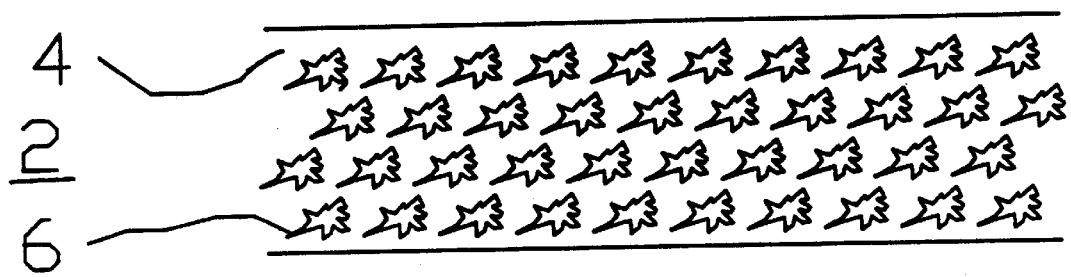
FIG. 1 shows a luminescent layer according to the invention.
Figure 2:
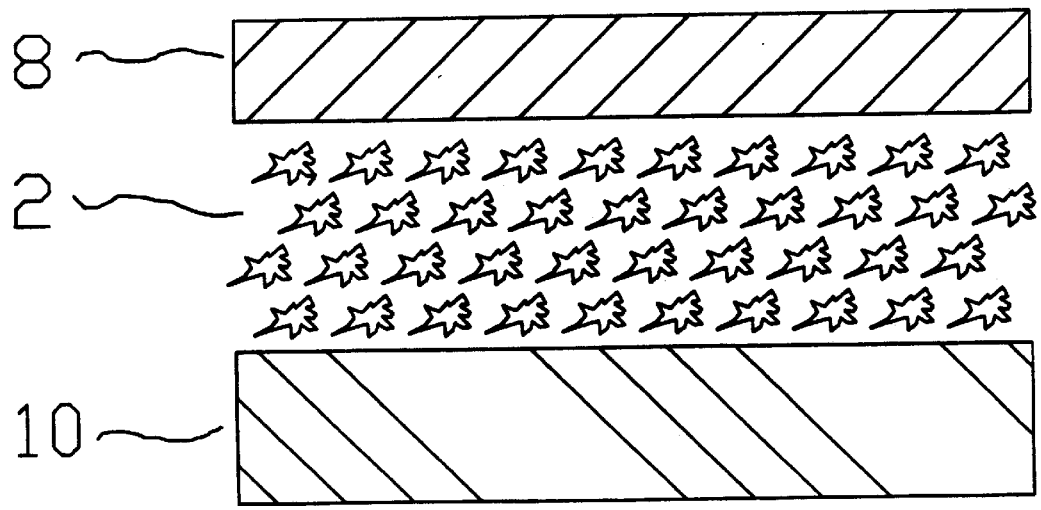
FIG. 2 shows a luminescent device having the luminescent layer positioned between dielectric layers.

Referring to the drawings, FIG. 1 shows a layer of a luminescent composition useful for constructing a device according to the invention. It is shown to be a layer 2 of a composition comprising a sol gel dielectric 4 which provides a dielectric encapsulation for phosphor particles 6. This sol gel provides protection from outside degradation of the phosphor and dielectric, i.e. electrical isolation from its environment. This sol gel material may be either of a dielectric composition or a dielectric ceramic where the gel has been calcined to form an oxide or other dielectric material. Phosphor particles 6 can be single crystal phosphors, nanocrystals of phosphors or any phosphor on the order of 10 micrometers or less in size preferably the phosphor particle size is between 1 micrometer and 10 micrometers. Preferably the phosphor particles have a particle size of about one-half micrometer or less and most preferably the phosphor has a particle size of about one-tenth micrometer or less. The selection of particle size can be made by those skilled in the art depending on the desired application. FIG. 2 shows a multilayer luminescent device. It has a first dielectric 8 which could be another sol gel dielectric or a dielectric put down by another method. Layer 2 is the sol gel dielectric with phosphor. This device has a third dielectric 10 which also has no phosphor. This layer 10 which also could be a sol gel or another type of dielectric would be present to isolate the inner phosphor/sol gel dielectric layer 2. Alternate dielectrics for layers 8 and 10 non-exclusively include glass, plastics and the like.

Figure 3:
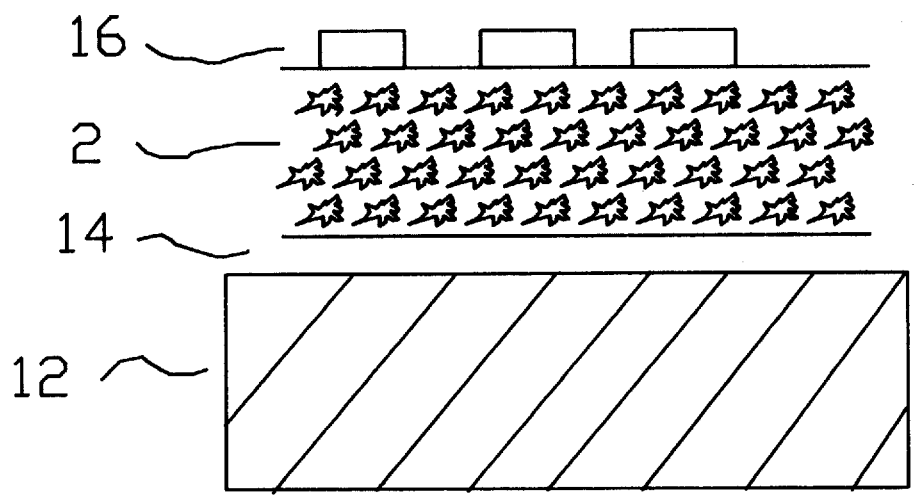
FIG. 3 shows an electroluminescent device configuration according to the invention having a patterned conductor.

FIG. 3 shows an electroluminescent device configuration according to the invention. It comprises a substrate 12 which provides overall structural support. In the preferred embodiment it comprises a transparent glass or plastic. The light generated in the luminescent layer can be observed through this support. The device has a first conductor layer 14 on the substrate which provides one of the electrical contacts to apply power to the device. It is preferably transparent and preferably comprises a material such as indium tin oxide or tin oxide. Next is the previously described layer 2 with phosphors embedded in a sol gel dielectric. On top is a patterned second conductor 16. This provides the second electrical contact for the device. Typically conductor 16 would be aluminum 1000–1500 angstroms thick.

Figure 4:
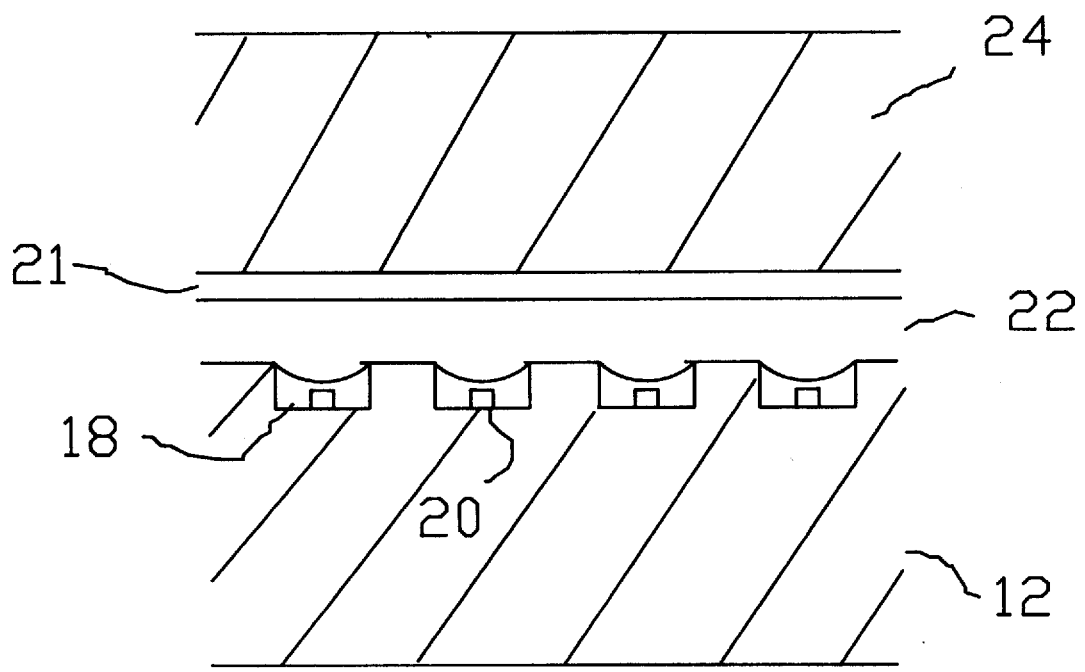
FIG. 4 shows a plasma device with a first substrate having wells for the phosphor, electrodes in the wells, a plasma gap and a second substrate with another set of electrodes.

The FIG. 4 embodiment shows a first substrate 12 having wells 18 and electrodes 20 in the wells. The phosphor sol gel composition is disposed on the wells around the electrodes. Alternating wells can have different phosphors. A uv light emitting plasma is disposed between in gap 22. Gap 22 is filled with gas at low pressure. A patterned luminescent sol gel/phosphor composition in wells 18 emit light when excited by the UV light from the plasma when a voltage is applied. A second substrate 24 having electrode 21, seals the device and keeps the plasma gas in the display.

Figure 5:
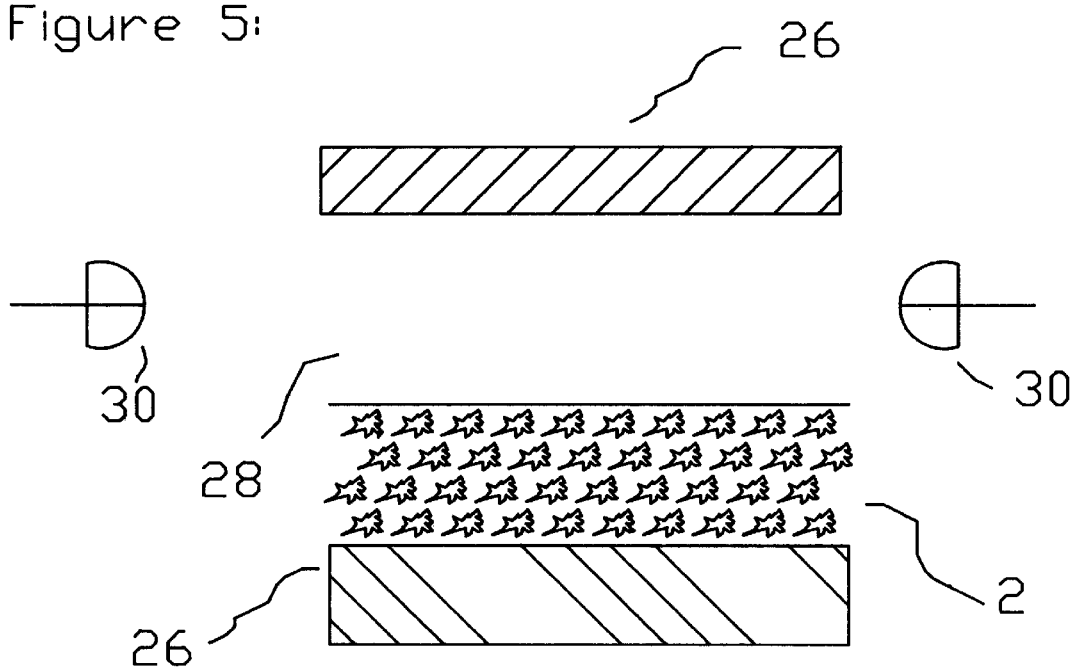
FIG. 5 shows a fluorescent light device having a transparent envelope vessel for uv plasma generated between two electrodes.
Figure 6:
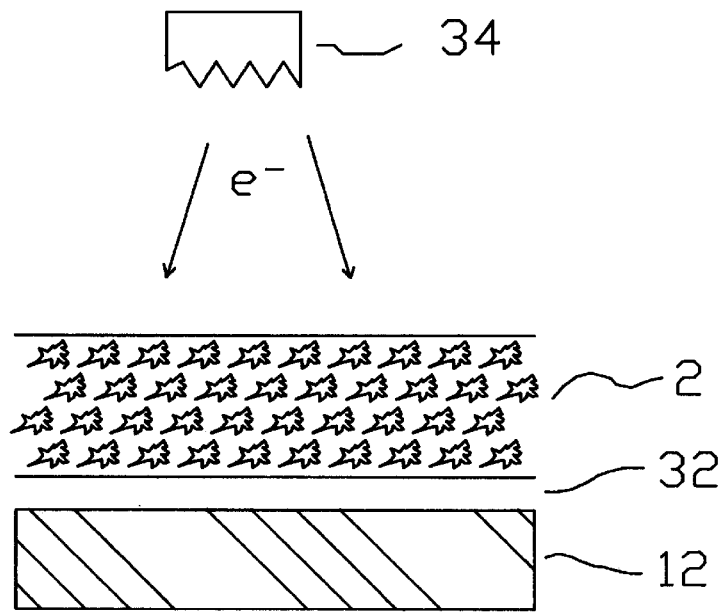
FIG. 6 shows an embodiment employing electron beam excitation for use in a cathode ray tube or field emitter display.

The embodiment of FIG. 5 shows fluorescent lights useful for liquid crystal back lights. Shown is a cross sectional view of a transparent envelope 26 which forms a vessel for uv plasma between two electrodes. Light from the luminescent layer passes through the envelope. In this case it is shown in a parallel configuration. A patterned or unpatterned luminescent layer 2 emits light when excited by the uv emission from the plasma. A plasma is formed in region 28 between electrodes 30. FIG. 6 shows an embodiment employing electron beam excitation for a cathode ray tube or field emitter display. A substrate 12 provides structural support for the overall device. In the preferred configuration the support is a transparent glass. This provides a vacuum jacket for the device, i.e., it may be the front of a tube in a CRT or the front plate in a field emitter display. The light generated by the luminescent layer is observed through this support. Patterned or unpatterned luminescent layer 2 emits light when excited by the electrons from the electron gun in a CRT or from the field emitters in a field emitter display. Patterned or unpatterned electrode 32 provides the sink for the electrons directed at the display. Electron source 34, shown in the figure to be emitting electrons, may be a hot filament emitter as in a CRT, or a field emitter for a field emitter display.

Figure 9:
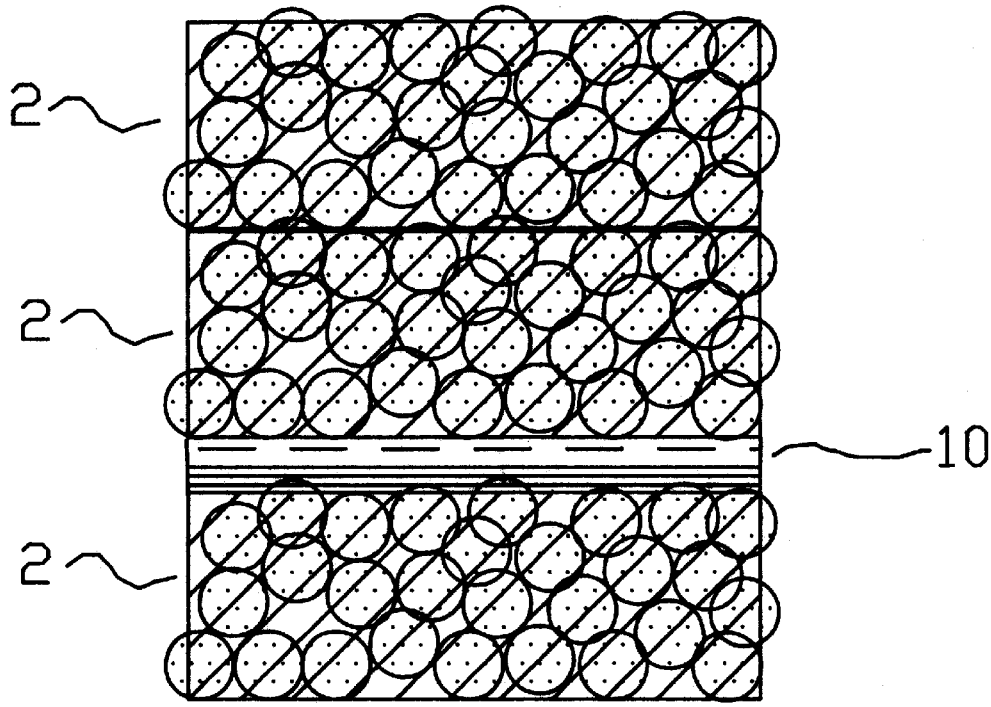
FIG. 9 shows a multilayered or multicolor device multiple luminescent device layers and a dielectric layer.
Figure 10:
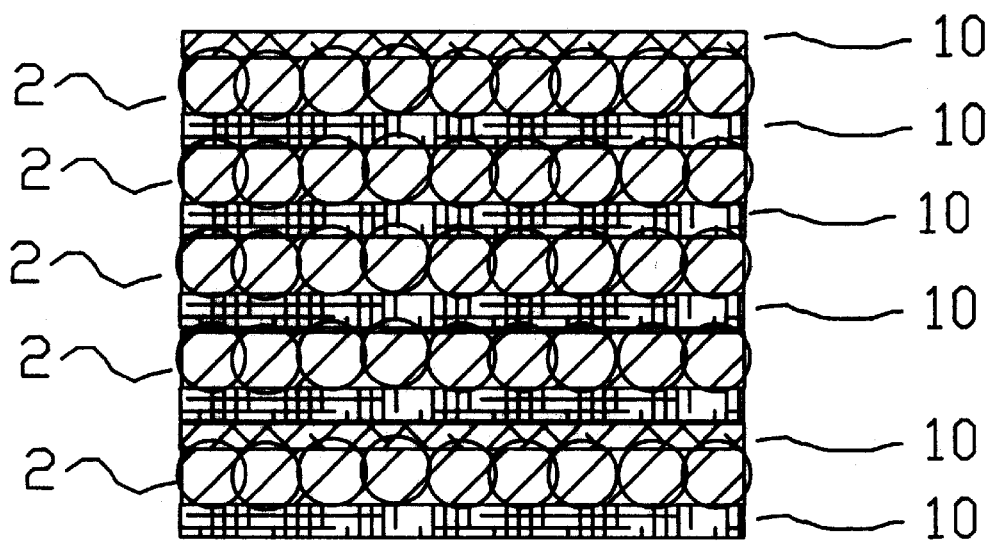
FIG. 10 shows another multilayer luminescent device with additional layers of dielectric.
Figure 11:
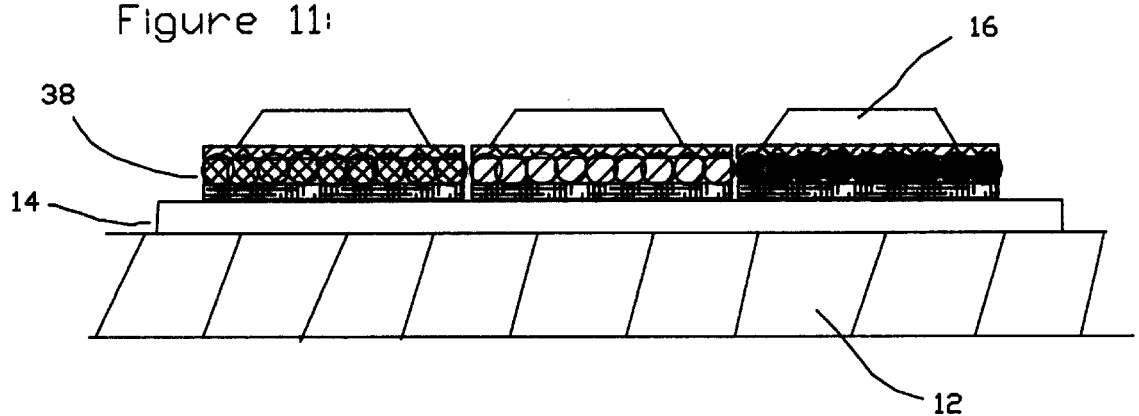
FIG. 11 shows a patterned electroluminescent device having a patterned luminescent device layer

The embodiments of FIGS. 1 through 6 operate as electroluminescent, photoluminescent or cathode luminescent devices. In all these uses the device works in the same way as prior art devices prepared with standard processes. This invention provides improved operation and fabrication techniques. In an electroluminescent configuration the device operates under high field which causes electrons to move in the phosphor and excite dopants leading to light emission. In the photoluminescent devices such as plasma and fluorescent lights, the luminescent layer replaces the phosphors which are coated on the inside of the envelope or on the side walls of the substrate. In cathode-luminescent devices the luminescent layer replaces the phosphors on the screen. FIG. 7 shows another embodiment of the invention wherein the phosphor particles 6 are single crystal phosphors or nanocrystals of phosphors or any phosphor on the order of 1 micrometer in size. In this case the packing density is much higher than shown in previous figures and the phosphor particles 6 can touch. The sol gel dielectric 4 again provides a dielectric encapsulation for the phosphor which provides protection from outside degradation of the phosphor and dielectric (electrical) isolation. FIG. 8 shows a multilayer luminescent device. A first dielectric 8 can be a sol gel dielectric or a dielectric put down by another method. Sol gel dielectric and phosphor layer 2 again shows the dielectric encapsulation for the phosphor. In this case the phosphor is formed with a high packing density and the other layers 8 and 10 provide additional encapsulation. Dielectric layer 10 with no phosphor can be formed to isolate the inner phosphor/sol gel dielectric. This layer 10 can also be a sol gel or another type of dielectric. Multiple layers could be used to improve performance. FIG. 9 shows a multilayered or multicolored device. Luminescent device layers 2 are multiple phosphor sol gel layers described above. An additional dielectric layer 10 can be added to the stack to improve the breakdown characteristics or to planarize the stack. FIG. 10 shows another multilayer luminescent device. Luminescent device layers 2 are the phosphor sol gel layers described above. This layer in the stack has additional layers of dielectric 10. FIG. 11 shows a patterned electroluminescent device. It comprises a top electrode 16, substrate 12, bottom electrode 14 and patterned luminescent device layer 38 comprises the phosphor sol gel layer described previously. In this case the layer containing the phosphor has been patterned so that a full color display would be formed. The top and bottom sol gel dielectric layer do not have to be patterned.

In the preparation of the phosphor sol gel composition, a phosphor and a sol gel are blended together such that the phosphor particles are encapsulated by the sol gel. Examples of phosphors non-exclusively include zinc sulfide, europium, zinc fluoride, activated yttrium orthovanadate, tungstates, uranyl salts, platinocyanides, gallium arsenide and gallium phosphide, however, any phosphor having the requisite particle size can be used. Examples of sol gels non-exclusively include silicon dioxide, silicon nitride, lead zirconate titanate, potassium niobium trioxide, barium titanium trioxide, lithium niobium trioxide, sulfur boron nitride, lead boron nitride and potassium titanium nitride, however any sol gel capable of encapsulating the phosphor particles can be used. In the preferred embodiment, the phosphor is preferably present in the composition in an amount of from about 40% to about 80% by weight of the composition. In the preferred embodiment, the sol gel is preferably present in the composition in an amount of from about 60% to about 20% by weight of the composition. The blending is preferably conducted in a suitable solvent composition which is subsequently removed by known means, such as evaporation. In the preferred embodiment, the sol gel encapsulated phosphor in solvent is uniformly coated onto a substrate 10 and dried thus leaving a uniform layer on the substrate. The sol gel can be applied by spraying, roller coating, spinning or the like. The sol gel may be heated to improve its properties. The method of forming the luminous composition comprises forming a substantially uniform mix of a particulate phosphor, a sol gel and a solvent such that the sol gel substantially encapsulates the phosphor particles, and then removing the solvent. In the preferred embodiment, the sol gel encapsulated phosphor in solvent is uniformly coated onto a substrate 10 and dried thus leaving a uniform layer on the substrate. Suitable substrates non-exclusively include transparent glasses and plastics. The substrate may have a thickness which ranges from about 1/20 inch to about 1/4 inch. The phosphor sol gel composition layer may have a thickness which ranges from about 0.1 micrometers to about 20 micrometers.

In the embodiment of FIG. 2, dielectric 8 can be one of the above sol gel dielectrics without phosphor which is similarly applied or a dielectric put down by another known method. In the embodiment of FIG. 3, the electrical conductor layer 14 may be any suitable material capable of being applied in a uniform layer by known means. Preferably it comprises a transparent material such as indium tin oxide or tin oxide. Dielectric and conductive layers may be applied out of a suitable solution with solvent evaporation. Patterning may be by standard photolithographic imaging and etching techniques which are well known in the art. Plasma displays and fluorescent lights are also well known in the art. Such non-exclusively include AC and DC plasma with various structures and positions for the phosphors. Voltages applied to the formed devices fall within the ranges of known devices and typically range from about 150 to about 250 volts.

What is claimed is:

1. A luminescent composition for use in a display device comprising a substantially uniform mixture of at least one phosphor having a particle size of about (ten) one-half micrometer or less and in an amount sufficient to cause the luminescent composition to generate light substantially uniformly upon application of a phosphor excitation means, and a dielectric material formed by a sol-gel process, wherein the dielectric material is in an amount sufficient to substantially encapsulate the phosphor, and wherein the phosphor is 40% to 80% by weight of the composition and the dielectric material is 60% to 20% by weight of the composition.

2. The luminescent composition of claim 1 wherein the phosphor has a particle size of about (1 to about 10 micrometers) one-tenth micrometer or less.

3. The luminescent composition of claim 1 wherein the phosphor is selected from the group consisting of single crystal phosphors and nanocrystals of phosphors.

4. The luminescent composition of claim 1 wherein the sol gel is selected from the group consisting of silicon dioxide, silicon nitride, lead zirconate titanate, potassium niobium trioxide, barium titanium trioxide, lithium niobium trioxide, sulfur boron nitride, lead boron nitride and potassium titanium nitride.

* * * * *